United States Patent [19]
Yello

[11] 4,293,804
[45] Oct. 6, 1981

[54] RASTER-CENTERING CIRCUIT

[75] Inventor: Joseph F. Yello, Wooddale, Ill.

[73] Assignee: Zenith Radio Corporation, Glenview, Ill.

[21] Appl. No.: 123,546

[22] Filed: Feb. 22, 1980

[51] Int. Cl.³ .............................................. H01J 29/54
[52] U.S. Cl. ...................................................... 315/398
[58] Field of Search ......................................... 315/398

[56] References Cited
U.S. PATENT DOCUMENTS 2,250,884  7/1941  Bahring ............................... 315/398
2,470,197  5/1949  Torsch ................................. 315/398

FOREIGN PATENT DOCUMENTS 892349  3/1962  United Kingdom ................. 315/398

Primary Examiner—Theodore M. Blum

[57] ABSTRACT

In a raster-centering circuit for a TV set or other cathode ray tube system, various voltage divider configurations including adjustable resistances are used to establish adjustment DC levels at one or both ends of a vertical deflection coil. If these adjustable resistances are adjusted to apply a potential difference across the deflection coil, the result is a constant centering current flowing through the coil to maintain a steady-state magnetic bias field for vertical centering of the electron beam. In one configuration the sweep amplifier itself is part of the DC centering current path. All of the adjustable resistances are ganged in aiding relationship so far as their effect on the direction of beam centering is concerned.

2 Claims, 5 Drawing Figures

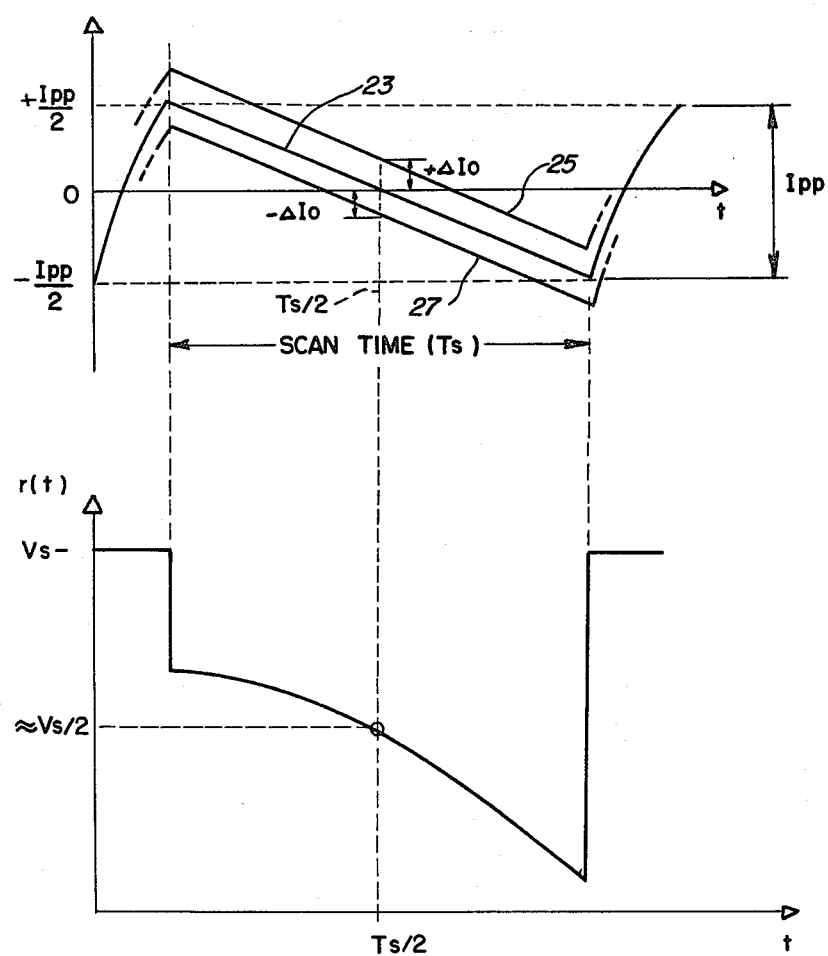

RASTER-CENTERING CIRCUIT

This invention relates generally to cathode ray tube circuits, and particularly concerns centering of CRT rasters.

RELATED APPLICATION

This application is related to my U.S. patent application entitled "Raster-Centering Circuit for Multiple Raster CRT Systems, Serial No. 123,545," filed on the same day as this one.

BACKGROUND OF THE INVENTION

A cathode ray tube generates an image-producing raster by means of a pair of deflection yokes which sweep the electron beam in vertical and horizontal coordinates respectively. Although electrostatic deflection is known, most yokes deflect the beam magnetically. Typically they do this by driving a sawtooth current through a deflection coil to generate a varying magnetic field which deflects the beam across the tube face.

In order to center the raster upon the CRT screen, such magnetic deflection systems may superimpose a steady magnetic field upon the varying field in order to move the center position of the beam to the geometric center of the screen. Several ways of doing this are known.

One involves the use of permanent magnets to impose a DC magnetic bias upon the neck of the CRT. Such systems involve cumbersome mechanical means for adjusting the position of the magnets.

Other approaches avoid these mechanical problems by electrically generating a steady-state magnet bias field. For example, a separate bias coil (not electrically connected to the deflection coil) may be mounted on the neck of the tube, and a constant current may be driven through this bias coil to generate a non-varying magnetic field. The magnitude of the bias field is then easily adjusted electrically, by adjusting the level and direction of the current in the separate coil. But the provision of a separate bias coil adds to the expense of the cathode ray tube.

There is another electrical approach to the problem of beam centering, one which does not require a separate bias coil. This involves driving a constant bias current through the deflection coil itself, the constant current being superimposed upon the varying deflection current which generates the raster sweep. The advantage of this approach is that it makes the deflection coil do double duty. But in this type of system it is necessary to isolate the DC bias circuit from the AC sweep circuit. Prior art proposals for accomplishing this have envisioned the use of a transformer to isolate the bias supply from the sweep current source. The transformer adds weight and expense, and also necessitates additional components for rectifying and filtering the AC voltage which is taken from the secondary of the transformer.

Accordingly, this invention contemplates an improved system for centering a magnetic CRT deflection circuit. The system is electrical, and therefore requires no permanent magnets or mechanical linkages. It uses the deflection coil itself for both sweep and bias, and so does not require a separate bias coil. It does not require a transformer for isolation, and thus also avoids the need for rectification and filtering of the bias supply.

BRIEF DESCRIPTION OF THE DRAWINGS

FIG. 4A is a vertical deflection yoke load current waveform; and FIG. 4B is a vertical deflection output voltage waveform, the time scale of which is correlated with FIG. 4A.

DETAILED DESCRIPTION OF THE PREFERRED EMBODIMENTS

Figure 1:
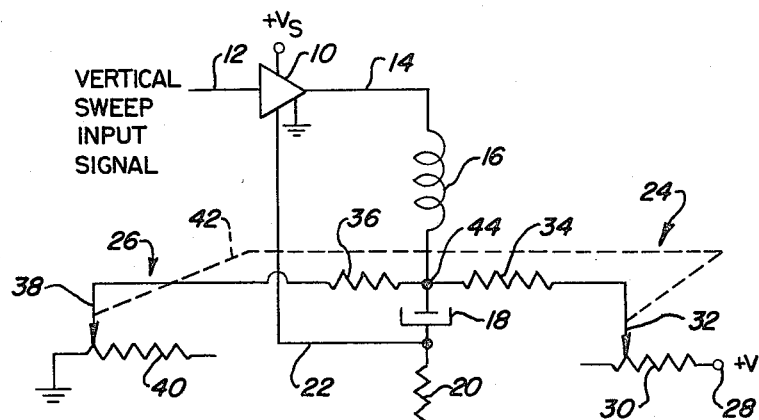
FIG. 1 is a schematic circuit diagram of a preferred embodiment of a vertical deflection circuit in accordance with this invention.

The present invention relates to both vertical and horizontal deflection circuits, but for purposes of illustration it will be described in connection with a vertical deflection circuit. In FIG. 1 there is seen the final output amplifier stage 10 of a vertical deflection circuit of a television set or other cathode ray tube display system. The input to the amplifier 10 is the vertical sweep signal appearing on a line 12. The amplifier output signal appears on line 14 and is applied to one end of a vertical deflection coil 16. The other end of the deflection coil 16 is connected through a DC isolation capacitor 18 and a sensing resistor 20 to ground. Components 16, 18 and 20 collectively comprise the vertical deflection yoke load driven by amplifier 10. A sensing signal is developed across the resistor 20 by the vertical deflection output, and this signal is fed back over a line 22 to the gain control port of the vertical deflection output amplifier 10 to improve linearity. As so far described, except for the capacitor 18, the circuit is entirely conventional.

In FIG. 4A waveform 23 shows the yoke load current over a single vertical beam deflection trace. When the load current rises to a positive peak $I_{pp}/2$ the electron beam is vertically deflected to one edge of the CRT screen for the start of a raster scan. When the load current declines to zero, the beam is approximately in the center of the screen and the raster scan is half completed. Finally, when the load current swings to its negative peak $-I_{pp}/2$, the beam is vertically deflected to the opposite edge of the screen for the conclusion of the raster scan. The capacitor 18 has a value such that it presents a low impedance at the frequency of the AC vertical deflection signal.

If the raster produced by the varying deflection current flowing through the coil 16 is not centered between the top and bottom of the CRT screen, then some sort of adjustment is needed to shift the rest position, i.e. the zero deflection current position, of the electron beam so that it is in the center of the screen. In the circuit of this invention this is accomplished by generating a steady-state magnetic field, which is superimposed upon the alternating magnetic field generated by the deflection current provided by the output amplifier 10. The most economical way to accomplish this is to use the deflection coil 16 itself to produce the steady-state bias field. This can be achieved by driving a steady-state bias current through the deflection coil 16 so that it is superimposed upon the sawtooth deflection current (waveform 23) of FIG. 4A. As a result, the yoke load current shifts from waveform 23, which has a value $I_0=$zero at center-scan time $T_s/2$ to waveform 25 (for one direction of centering correction) or waveform 27 (for the opposite direction of centering correction), so that the center-scan current value $I_0$ shifts by plus or minus $\Delta I_0$ respectively. Both the magnitude and the direction of the bias current must be controlled, because its direction determines the direction of the centering deflection exerted upon the electron beam by the magnetic field, and its magnitude determines the extent of such beam deflection.

Because of individual production variations, neither the extent nor the direction of the bias correction needed for a given TV set or other cathode ray tube display system can be predicted in advance. Therefore the centering current must be able to be adjusted through a range of positive and negative values, that is to say from a maximum bias current in one direction through zero to a maximum bias current in the other direction. A positive bias current deflects the beam in one direction by an amount proportional to the magnitude of the current, and a negative bias current deflects the beam in the opposite direction by an amount proportional to its negative magnitude. If no correction is needed, the bias current must be zero.

In accordance with the present invention, the vertical deflection circuit includes two circuit sections 24 and 26 which perform the centering function. It will be helpful to think of the bias current running through deflection coil 16 as the net resultant of two opposite steady-state current components flowing in opposite directions through the coil. Section 24 is responsible for driving a first constant current in one direction through the deflection coil 16, while section 26 is responsible for driving a second constant current through the deflection coil 16 in the opposite direct. Section 24 comprises a positive DC voltage source 28 which is greater than the center-scan deflection voltage $V_s/2$ in FIG. 4B (i.e. V exceeds $V_s/2$). This potential is applied to one end of a potentiometer 30, while the other end of the potentiometer is open-circuited. The potentiometer has a wiper 32 which is connected through a current-limiting resistor 34 to the "bottom" end of the deflection coil 16. As a result, the voltage difference $V-V_s/2$ causes a steady-state current to flow through the potentiometer 30, its wiper 32, the limiting resistor 34, and the deflection coil 16, to the output terminal of the vertical sweep amplifier 10. Amplifier 10 is a conventional vertical output stage, the output of which is not limited to uni-directional current flow; current can flow inward to the output port of the amplifier 10 as well as outward therefrom.

The other circuit section 26 comprises a current-limiting resistor 36 leading from the bottom end of the deflection coil 16 to the wiper 38 of another potentiometer 40. One end of potentiometer 40 is open-circuited, while the other end is grounded. Because of the potential difference between the positive output voltage of amplifier 10 and ground, circuit section 26 draws current from the amplifier 10 through the deflection coil 16, the limiting resistor 36, the wiper 38 and the potentiometer 40 to ground. This latter current is a steady-state current, superimposed upon the varying deflection current which the amplifier 10 drives through the deflection coil 16, capacitor 18, and resistor 20 to ground.

Note that the DC isolation capacitor 18, although it presents a low impedance to the alternating sweep current flowing through the deflection coil 16, presents essentially an infinite impedance to the two direct currents which flow through the coil 16 as a result of circuit sections 24 and 26. Stated another way, the capacitor 18 isolates the DC voltage level produced at circuit point 44 by circuit sections 24 and 26, from the sensing resistor 20 and the sensing line 22.

Using the standard conventions for current direction, it will be seen that the constant current provided by circuit section 24 flows "upwardly" through the deflection coil 16, and is thus opposed to the constant current provided by circuit section 26, which flows "downwardly" through the deflection coil. If these two constant currents are equal in magnitude, the net constant current flowing through the coil 16 will be zero. But if either current exceeds the other, then the direction of the net constant current will be the direction of the larger component, and its magnitude will be equal to the difference in magnitudes between the two components. In any case, the net constant current will be superimposed upon the alternating deflection current which also flows through the deflection coil 16.

For a given direction (or polarity) of the net constant current flowing through the deflection coil 16, the rest position of the electron beam (i.e. the position of the beam at time $T_s/2$) will be shifted in one vertical direction on the TV screen by an amount proportional to the magnitude of the net constant current, e.g. $+\Delta I_0$. For the opposite polarity of the net constant current, the rest position will be shifted in the opposite vertical direction by an amount which is again proportional to the net current magnitude, in this case $-\Delta I_0$. Thus, by choosing the direction (i.e. polarity) of the net constant current, the electron beam can be shifted up or down to correct for any initial inaccuracies. The amount of the correction can be controlled by adjusting the magnitude of the net constant current.

These adjustments are made by means of a manual control knob and a suitable gang linkage which drives both of the potentiometer wipers 32 and 38 together. This mechanism is schematically represented by the dashed line 42 which indicates that the two potentiometer wipers 32 and 38 are ganged for simultaneous operation in response to an appropriate manual control device. In addition, the circuit diagram is drawn so that the wipers 32 and 38 both appear at the same (i.e. left) ends of their respective potentiometers 30 and 40 at the same time; this is intended to indicate that when the gang control 42 is operated, the potentiometer wipers 32 and 38 either move simultaneously to the right or simultaneously to the left relative to the view of FIG. 1.

The DC voltage source 28 and ground are connected to opposite (right and left) ends of their respective potentiometers 30 and 40. Therefore when the gang control 42 is operated in one direction, the effective resistance of potentiometer 30 which is in series with one of the two constant current components decreases, while at the same time the effective resistance of potentiometer 40 which is in series with the other one of the constant current components increases. As a result, the constant current component provided by circuit section 24 increases, because of the decreasing series resistance of potentiometer 30. At the same time, the opposite constant current component decreases, because of the increasing series resistance of potentiometer 40 in circuit section 26. It follows that the effects of the simultaneous changes in the series resistances of potentiometers 30 and 40 are aiding. One change tends to increase the upward current component while the simultaneous change tends to decrease the downward current component. If the upward direction is arbitrarily defined as positive, both of these effects tend to shift the value of the net constant current in the positive direction; i.e. making it either less negative or more positive.

Conversely, when the gang control 42 is operated in the opposite direction, the series potentiometer resistance in circuit section 24 increases and the series potentiometer resistance in circuit 26 decreases. This tends to decrease the upward current component and increase the downward current componet flowing through the deflection coil 16. Both of those changes tend to shift the net constant current in the deflection coil in the negative direction; i.e. more negative or less positive.

In sum, the gang control 42 causes the potentiometers 30 and 40 to aid each other so that the constant current in the deflection coil 16 is shifted maximally either in the positive or the negative direction. In this way the steady-state magnetic bias imposed upon the electron beam can also be made more positive or more negative as desired. Since the net constant current flowing through the deflection coil 16 can be shifted to either side of zero, the magnetic bias can be made to point in either of two opposite directions, thus giving the user a choice of upward or downward beam centering corrections. In those CRT installations where the rest position of the beam is too low, the net constant current can be adjusted to flow in the appropriate direction for biasing the beam up toward the center of the screen; whereas in those installations where the rest position of the beam is too high, the opposite net constant current direction can be employed for biasing the beam down toward the center of the screen.

Another way of analyzing the operation of the circuit seen in FIG. 1 is to view circuit sections 24 and 26 as providing a voltage divider. That is to say, the total DC voltage appearing between terminal 28 and ground is divided between the variable resistance of potentiometer 30 and the fixed resistance of resistor 34 on the one hand, and the fixed resistance of resistor 36 and the variable resistance of potentiometer 40 on the other hand. This divided voltage appears at circuit point 44, i.e. at the bottom end of the deflection coil 16. The positive DC voltage which the voltage divider establishes at circuit point 44 is effectively isolated from resistor 20 and line 22 by capacitor 18, but is is not isolated from deflection coil 16 and the output terminal of amplifier 10. Therefore, depending upon the exact value of the DC voltage at circuit point 44 and the average output voltage of amplifier 10, the voltage divider will either drive DC current "upwardly" through the deflection coil 16 into the output terminal of the amplifier 10 or will draw current "downwardly" through the deflection coil 16 from the output terminal of the amplifier 10. In either case, there will be a constant current of some polarity and magnitude flowing through the coil 16, unless the DC voltage at circuit point 44 is exactly equal to the average voltage at the output terminal of the amplifier 10.

The exact value of the DC voltage at circuit point 44, moreover, is adjustable by the gang control 42 when it shifts the potentiometer wipers 32 and 38 in the manner described above. When these wipers move to the right relative to FIG. 1, less of the total DC supply voltage drop will occur across potentiometer 30 and more of it will occur across potentiometer 40. Accordingly, the voltage of circuit point 44 will shift in the positive direction. Conversely, when the gang control 42 is operated to move the potentiometer wipers 32 and 38 to the left relative to FIG. 1, then the result will be to drop more of the DC supply voltage across potentiometer 30 and less of if across potentiometer 40. That will cause the voltage of circuit point 44 to shift in the negative direction. Note again that the effects of the simultaneous motions of the potentiometer wipers 32 and 38 are aiding so far as the DC current flowing through the deflection coil 16 is concerned.

In the embodiment of FIG. 1 the amplifier 10 serves not only as a source for the alternating sweep current which flows through the deflection coil 16, but in addition it cooperates with circuit sections 24 and 26 in driving the two constant current components in opposite directions through the deflection coil 16. A different circuit design approach, one which produces a similar result but does not use the sweep amplifier 10 as part of the centering circuit, is seen in FIG. 2.

Here again the vertical sweep signal input on line 12 is boosted by amplifier 10 and outputted over line 14 to apply a sawtooth deflection current to coil 16, isolation capacitor 18, and sensing resistor 20, while the sensing line 22 returns from the high voltage end of resistor 20 to the gain control and linearity input of the amplifier 10. Here, however, there is also an additional capacitor 146 connected between the output of amplifier 10 and the deflection coil 16. This capacitor 146 provides a low impedance for the sawtooth deflection current, but it serves to provide DC isolation between the output of the amplifier 10 and the rest of the circuit. In addition, there is a circuit section 124 in which one end of a potentiometer 130 is connected to the DC voltage source 128B, and the other end of the potentiometer 13 is grounded. The potentiometer 130 has a wiper 132 which is connected through a current-limiting resistor 134 to the bottom end of the deflection coil 16. In similar fashion, another circuit section 126 has a potentiometer 140, one end of which is connected to the DC voltage source 128B, and the other end of which is grounded. Potentiometer 140 has a wiper 138 which is connected through a current-limiting resistor 136 to the top end of the deflection coil 16.

Because of this circuit configuration, the magnitude and polarity of the constant current flowing through deflection coil 16 depends upon the magnitude and polarity of the voltage difference between potentiometer wipers 132 and 138. These potentiometer wipers are ganged together by a control mechanism schematically illustrated by the dashed line 142, so that they move conjointly to the right or conjointly to the left, depending upon the direction in which the control 142 is operated. Furthermore, FIG. 2 is arranged so that both wipers 132 and 138 are at the same end (i.e. the left end) of their respective potentiometers 130 and 140, but the high voltage end of potentiometer 130 is at the right, while the high voltage end of potentiometer 140 is at the left. This is intended to indicate that when the potentiometer wipers 132 and 138 moves conjointly to the right, the voltage on wiper 132 increases at the same time that the voltage on wiper 138 decreases. The converse is is true when these potentiometer wipers move conjointly to the left. As a result, the effect of the conjoint potentiometer adjustments is aiding so far as the constant current in deflection coil 16 is concerned.

Figure 2:
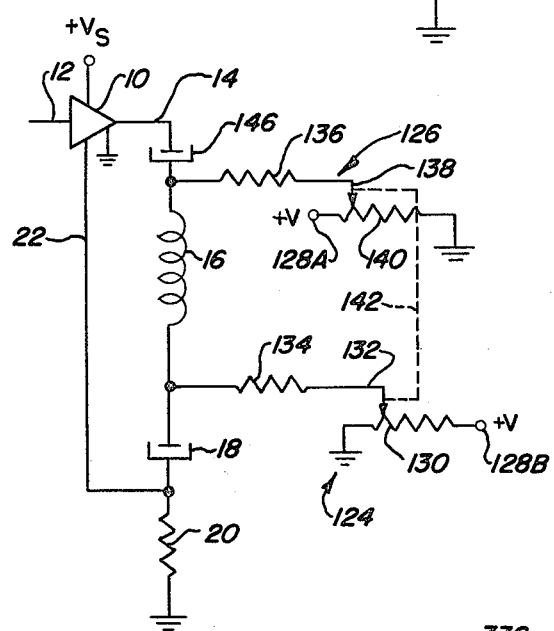
FIG. 2 is a schematic circuit diagram of an alternative embodiment of a vertical deflection circuit in accordance with this invention.

FIG. 2 can also be analyzed in either of two alternative ways. One way is to think of the constant centering current in deflection coil 16 as the net resultant of two components flowing in opposite directions. One of these is the current flowing through potentiometer 130, wiper 132, resistor 134, upward through deflection coil 16, resistor 136, wiper 138 and potentiometer 140 to ground. The other component flows from voltage source 28 through potentiometer 140, wiper 138, resistor 136, downwardly through deflection coil 16, resistor 134, wiper 132 and potentiometer 130 to ground.

In an alternative circuit analysis, each of the potentiometers 130 and 140 may be regarded as a voltage divider, the adjustable wipers 132 and 138 tapping off inversely adjustable voltages and coupling them through the respective resistors 134 and 136 to opposite ends of the deflection coil 16, so that the resulting constant current through the coil is a function of the difference between the voltages on the potentiometer wipers 132 and 138.

Figure 3:
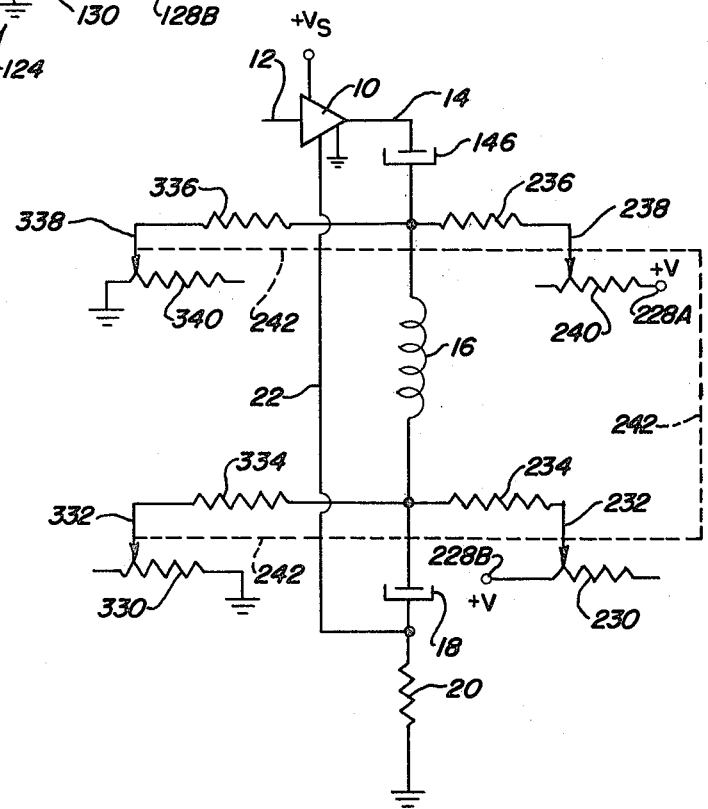
FIG. 3 is a schematic circuit diagram of another alternative embodiment of a vertical deflection circuit in accordance with this invention.

The alternative embodiment of FIG. 3 is also subject to both the opposing current analysis and the voltage divider analysis as spelled out in connection with FIGS. 1 and 2. The circuit of FIG. 3 differs from that of FIG. 2 only in that in FIG. 3 there are separate voltage dividers coupled to the bottom end and the top end of deflection coil 16 respectively. The first of these voltage dividers is traceable from voltage source 228B through a potentiometer 230, its wiper 232, a current-limiting resistor 234, another current-limiting resistor 334, wiper 332, and its associated potentiometer 330 to ground. The other voltage divider proceeds from voltage source 228A to the potentiometer 240, its wiper 238, a current-limiting resistor 236, another current-limiting resistor 336, wiper 338 and its associated potentiometer 340 to ground.

Dashed line 242 indicates not only that the two lower potentiometer wipers 232 and 332 are ganged, but also that the upper potentiometer wipers 238 and 338 are ganged with each other and with the lower potentiometer wipers 232 and 332. All four potentiometer wipers move conjointly to the right or conjointly to the left, depending upon the direction of operation of the gang control 242. FIG. 3 also is laid out in such a way that all four wipers are at the same (i.e. the left) end of their respective potentiometers, but the high voltage end of potentiometer 240 is at the right and the high voltage end of potentiometer 230 is at the left; while the ground end of potentiometer 330 is at the right and the ground end of potentiometer 340 is at the left. Thus when the four potentiometer wipers move conjointly to the right, the voltage at the top end of the deflection coil 16 goes more negative. When the control is moved in the opposite direction, the opposite result obtains. In each case the effects of the resulting voltage change at the top end of the deflection coil 16 and the resulting voltage change at the bottom end of the deflection coil 16 are aiding with respect to the constant current flowing through the deflection coil 16. If the circuit is analyzed in terms of two currents of opposite polarity flowing through the deflection coil 16, the result reached is the same.

In the circuit of this invention the resistive power dissipation in the deflection coil depends on the magnitude of the steady centering current flowing in the coil. Statistically, the number of instances in which large centering corrections are required will be small, and therefore deflection coil dissipation will be of acceptable proportions on the average. As to power dissipation in the potentiometers, this is maximized when they are relatively close to either of their extreme positions (about 10% of the way from either extreme position toward the center position). Since these settings are also statistically improbable, here again the power dissipation considerations are, on the average, favorable.

It is preferable, in each embodiment of the invention, for all of the potentiometers employed in the centering sections of the circuit to be of the same resistance value and taper. Otherwise the user would not obtain the same degree of beam centering correction for a given rotation of the centering control in one direction as for the same amount of rotation in the opposite direction. Such asymmetry is undesireable.

It will now be appreciated that the present circuit provides a convenient and inexpensive means of beam centering which does not require permanent magnets or mechanical linkages. Instead, it has all the advantages of other electrical adjustment techniques, but does not require transformer isolation, rectification or filtering.

The various embodiments of the invention described in detail above are merely exemplary, and it is possible that the principles of the invention may be embodied in other specific circuits. Accordingly, the scope of protection afforded this invention is to be limited only as defined in the appended claims.

I claim:

1. A cathode ray tube raster-generating and centering circuit comprising:

deflection drive means for providing a varying sweep current;

deflection coil means having one end coupled to said deflection drive means in such manner that said sweep current flows through said deflection coil means and the voltage of said one end is controlled entirely by the output of said deflection drive means;

means forming a voltage divider with opposite ends clamped at respective different D.C. voltages and center tap means adjustable within a voltage range between said D.C. voltages;

and means connecting said center tap means to the other end of said deflection coil means whereby to control the D.C. voltage of said other end.

2. A cathode ray tube raster-generating and centering circuit comprising:

deflection coil means;

deflection drive means connected for sensing a varying sweep current through said deflection coil means;

first potentiometer means;

means clamping one end of said first potentiometer means at a first D.C. voltage;

second potentiometer means;

means clamping one end of said second potentiometer means at a second D.C. voltage different from said first D.C. voltage;

means D.C.-coupling the taps of both said first and second potentiometer means to one and the same end of said deflection coil means;

and means ganging said taps whereby to control the D.C. voltage of said one end of said deflection coil means.

* * * * *